United States Patent
Kato et al.

(10) Patent No.: US 12,534,086 B2
(45) Date of Patent: Jan. 27, 2026

(54) VEHICLE AND COMPUTER PROGRAM

(71) Applicant: TOYOTA JIDOSHA KABUSHIKI KAISHA, Toyota (JP)

(72) Inventors: Yota Kato, Numazu (JP); Hirofumi Mori, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 18/739,345

(22) Filed: Jun. 11, 2024

(65) Prior Publication Data

US 2025/0136119 A1    May 1, 2025

(30) Foreign Application Priority Data

Oct. 26, 2023    (JP) .................. 2023-184025

(51) Int. Cl.
*B60W 40/02*    (2006.01)
*B60W 60/00*    (2020.01)

(52) U.S. Cl.
CPC .......... *B60W 40/02* (2013.01); *B60W 60/001* (2020.02); *B60W 2420/403* (2013.01); *B60W 2555/20* (2020.02)

(58) Field of Classification Search
CPC ............... B60W 40/02; B60W 60/001; B60W 2555/20; B60W 2420/403
See application file for complete search history.

(56) References Cited

U.S. PATENT DOCUMENTS

| | | |
|---|---|---|
| 9,796,416 B2 | 10/2017 | Fujii et al. |
| 10,108,190 B2 | 10/2018 | Tomatsu et al. |
| 10,222,796 B2 | 3/2019 | Ichikawa et al. |
| 10,308,254 B2 | 6/2019 | Hirano et al. |
| 10,310,508 B2 | 6/2019 | Kunisa et al. |
| 10,393,255 B2 | 8/2019 | Nishimine |
| 10,520,939 B2 | 12/2019 | Sato et al. |
| 10,525,983 B2 | 1/2020 | Ichikawa et al. |
| 10,654,482 B2 | 5/2020 | Urano et al. |
| 10,895,875 B2 | 1/2021 | Hashimoto et al. |
| 2019/0083964 A1 | 3/2019 | Yoshida et al. |

FOREIGN PATENT DOCUMENTS

| | | | |
|---|---|---|---|
| JP | 2017-081444 A | 5/2017 | |
| JP | 2017-177060 A | 10/2017 | |
| JP | 2019059278 A | * | 4/2019 |

* cited by examiner

*Primary Examiner* — Vivek D Koppikar
*Assistant Examiner* — Jeffrey R Chalhoub
(74) *Attorney, Agent, or Firm* — SoraIP, Inc.

(57) ABSTRACT

A vehicle capable of performing autonomous driving at a predetermined level or more at which monitoring obligation around the vehicle is unnecessary includes a vehicle surroundings confirmation device that is attached to the outside of the vehicle in order for a vehicle occupant to confirm a situation outside the vehicle, and a control device. The vehicle surroundings confirmation device is configured to switch between a first state in which the vehicle surroundings are confirmable to the vehicle occupant by the vehicle surroundings confirmation device, and a second state in which an area of a portion where traveling wind strikes the vehicle surroundings confirmation device is smaller than in the first state. The control device is configured to switch the vehicle surroundings confirmation device to the second state when the autonomous driving at a predetermined level or more at which the monitoring obligation around the vehicle is unnecessary is performed.

2 Claims, 4 Drawing Sheets

33

VEHICLE AND COMPUTER PROGRAM

CROSS-REFERENCE TO RELATED APPLICATION

This application claims priority to Japanese Patent Application No. 2023-184025 filed on Oct. 26, 2023, incorporated herein by reference in its entirety.

BACKGROUND

1. Technical Field

The disclosure relates to a vehicle and a computer program.

2. Description of Related Art

Japanese Unexamined Patent Application Publication No. 2017-177060 (JP 2017-177060 A) discloses a vehicle structure in which air resistance of a side mirror (outer rearview mirror) can be reduced when the vehicle is traveling.

SUMMARY

A vehicle surroundings confirmation device (e.g., an outer rearview mirror, an outer rearview camera, or the like) for a vehicle occupant, particularly a driver, to confirm a situation outside of the vehicle, is provided on an outside of the vehicle. In many vehicles, the vehicle surroundings confirmation device can be switched between a deployed state and a stored state. However, even though the vehicle structure may be improved as in JP 2017-177060 A described above, traveling wind strikes the vehicle surroundings confirmation device as long as the vehicle surroundings confirmation device is in the deployed state. Accordingly, there is a limit to reducing air resistance of the vehicle surroundings confirmation device when the vehicle is traveling.

The disclosure has been made in view of such problems, and an object thereof is to reduce the air resistance of a vehicle surroundings confirmation device when a vehicle is traveling.

In order to solve the above problem, a vehicle according to an aspect of the disclosure is configured to perform autonomous driving at autonomous driving level 3 or higher, at which duty of monitoring a periphery of the vehicle is unnecessary, the vehicle including
  a vehicle surroundings confirmation device that is attached on an outside of the vehicle in order for a vehicle occupant to confirm a situation of vehicle surroundings, and a control device.
The vehicle surroundings confirmation device is configured to switch between a first state in which the vehicle surroundings are confirmable to the vehicle occupant by the vehicle surroundings confirmation device, and a second state in which an area of a portion where traveling wind strikes the vehicle surroundings confirmation device is smaller than in the first state.
The control device is configured to switch the vehicle surroundings confirmation device to the second state when autonomous driving is performed at autonomous driving level 3 or higher, at which duty of monitoring the periphery of the vehicle is unnecessary.

Further, according to another aspect of the disclosure, a vehicle that is configured to perform autonomous driving at a predetermined level or higher, at which duty of monitoring a periphery of the vehicle is unnecessary, includes a vehicle surroundings confirmation device that is attached on an outside of the vehicle in order for a vehicle occupant to confirm a situation of vehicle surroundings.
The vehicle surroundings confirmation device is configured to switch between a first state in which the vehicle surroundings are confirmable to the vehicle occupant by the vehicle surroundings confirmation device, and a second state in which an area of a portion where traveling wind strikes the vehicle surroundings confirmation device is smaller than in the first state.
A computer program for a control device of the vehicle causes the control device to execute switching of the vehicle surroundings confirmation device to the second state when autonomous driving is performed at the predetermined level or higher, at which duty of monitoring the periphery of the vehicle is unnecessary.

According to these aspects of the disclosure, when autonomous driving is performed at the predetermined level or higher, at which duty of monitoring the periphery of the vehicle is unnecessary, the vehicle surroundings confirmation device is switched to the second state in which the area of the portion where the traveling wind strikes is smaller than in the first state. Accordingly, air resistance of the vehicle surroundings confirmation device can be reduced when the vehicle is travelling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
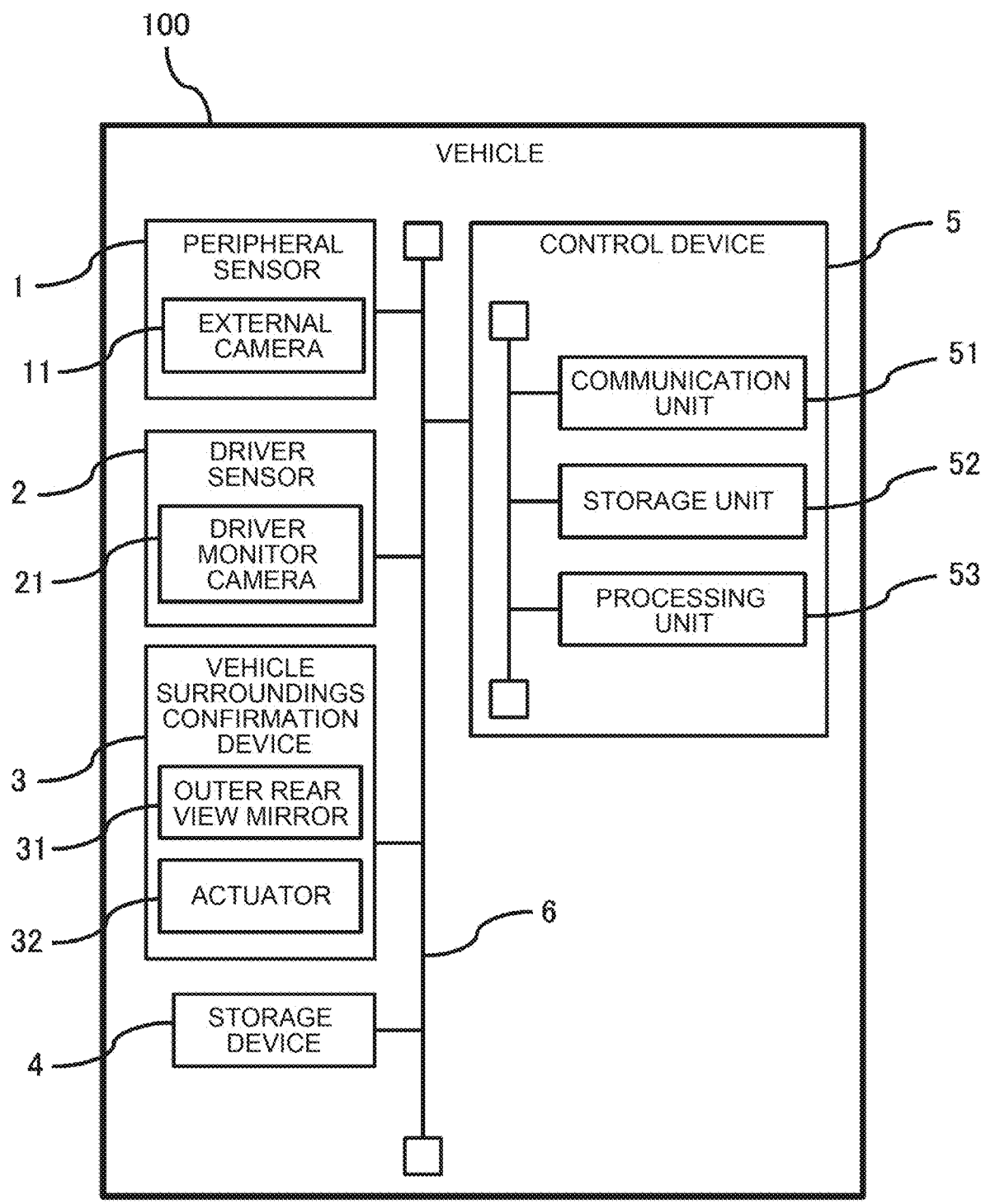
FIG. 1 is a schematic configuration diagram of a vehicle according to an embodiment of the present disclosure.

Hereinafter, embodiments of the present disclosure will be described in detail with reference to the drawings. In the following description, the same reference numerals are given to the same constituent elements.

FIG. 1 is a schematic configuration diagram of a vehicle 100 according to an embodiment of the present disclosure.

The vehicle 100 includes a peripheral sensor 1, a driver sensor 2, a vehicle surroundings confirmation device 3, a storage device 4, and a control device 5. The peripheral sensor 1, the driver sensor 2, the vehicle surroundings confirmation device 3, the storage device 4, and the control device 5 are communicably connected to each other via an in-vehicle network 6 conforming to a standard such as a controller area network.

The peripheral sensor 1 is a sensor for generating peripheral data representing a situation around the vehicle 100. In the present embodiment, the peripheral sensor 1 includes one or a plurality of external cameras 11 for capturing an image of the surroundings of the vehicle 100. The external camera 11 captures an image of the surroundings of the vehicle 100 at a predetermined frame rate (e.g., 40 [Hz] from 10 [Hz]), and generates surrounding images of the surroundings of the vehicle 100. Each time an ambient image is generated, the external camera 11 transmits the generated ambient image as ambient data to the control device 5.

Instead of the external camera 11 or in addition to the external camera 11, a distance measuring sensor that measures a distance to a target such as a vehicle or a pedestrian existing around the vehicle 100 may be provided as the peripheral sensor 1. Examples of the distance measurement sensor include a lidar (LiDAR; Light Detection and Ranging) that irradiates radar light and measures a distance based on the reflected light, and a millimeter-wave radar sensor that irradiates radio waves and measures a distance based on the reflected wave.

The driver sensor 2 is a sensor for generating driver data representing a state of the driver. In the present embodiment, the driver sensor 2 includes a driver monitor camera 21 for capturing an appearance including the face of the driver. The driver monitor camera 21 captures an appearance of the driver at a predetermined frame rate (for example, 40 [Hz] from 10 [Hz]), and generates an appearance image in which the appearance of the driver is captured. Each time the driver monitor camera 21 generates the appearance image of the driver, it transmits the generated appearance image to the control device 5 as driver data.

The vehicle surroundings confirmation device 3 is a device for a vehicle occupant, particularly a driver, to confirm the side and the rear of the vehicle 100 from the inside of the vehicle. In the present embodiment, vehicle surroundings confirmation device 3 includes an outer rear view mirror (also referred to as a side mirror or a door mirror) 31 provided on the outside of the door on the driver's seat side and the front passenger's seat side of the vehicle 100, respectively, and an actuator 32 for switching the outer rear view mirror 31 between the expanded state and the stored state shown in FIG. 2.

Figure 3:
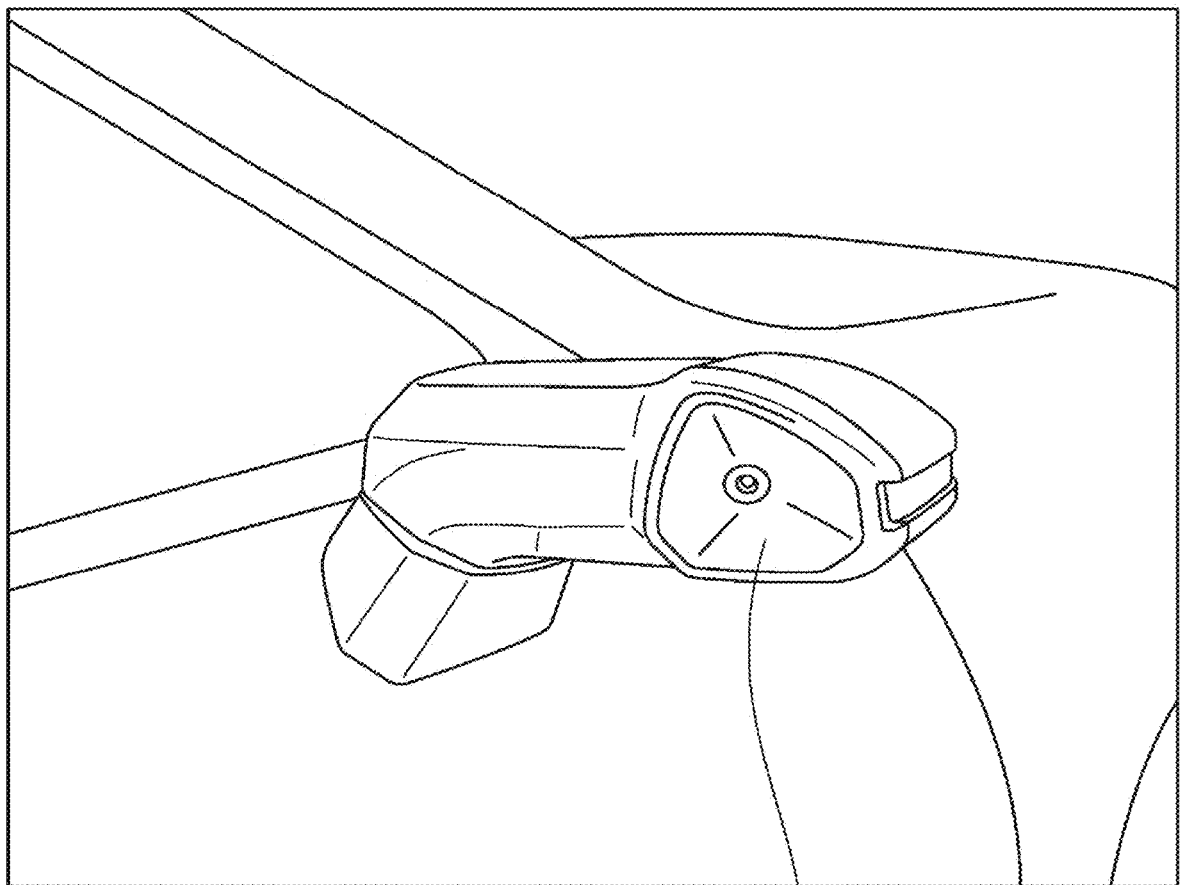
FIG. 3 is a schematic configuration diagram illustrating an exemplary outer rear view camera.

Note that the outer rear view mirror 31 may be an outer rear view camera 33 that captures an image of the side and the rear of the vehicle 100 as illustrated in FIG. 3. When the outer rear view mirror 31 is changed to the outer rear view camera 33, the driver confirms an image captured by the outer rear view camera 33 with a monitor or the like disposed inside the vehicle. Thus, the driver can check the side and the rear of the vehicle 100.

Figure 2:
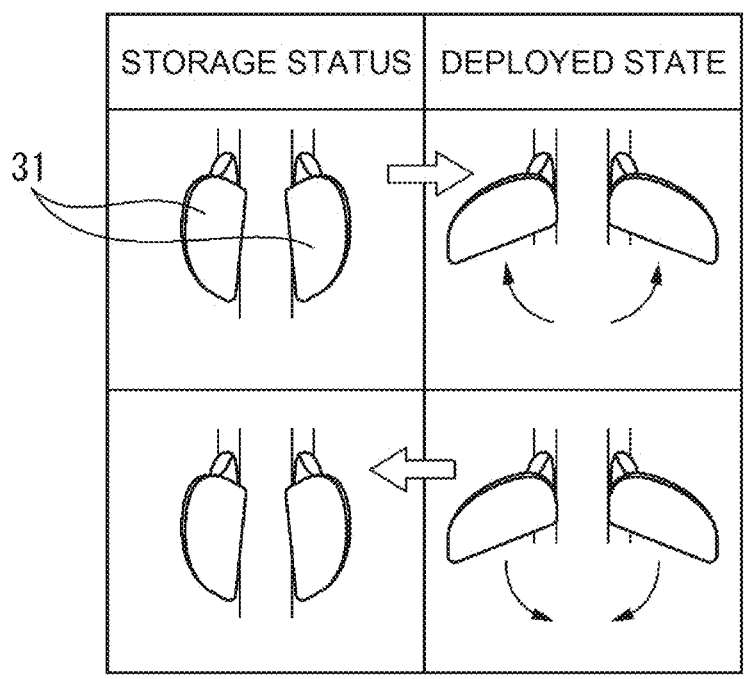
FIG. 2 is a view illustrating a pair of left and right outer rear view mirrors provided on the outside of the door on the driver's seat side and the front passenger's seat side of the vehicle, respectively.

FIG. 2 is a view showing a pair of left and right outer rear view mirrors 31 provided on the outside of the doors on the driver's seat side and the front passenger's seat side of the vehicle 100, respectively, extracted.

As illustrated in FIG. 2, the expanded state refers to a state in which the outer rear view mirror 31 is widened outward in the vehicle width direction so that the side and the rear of the vehicle 100 appear on the outer rear view mirror 31. By setting the outer rear view mirror 31 in the expanded state, the vehicle occupant, particularly the driver, can check the side and the rear of the vehicle 100 by viewing the outer rear view mirror 31 from the inside of the vehicle.

On the other hand, the stored state refers to a state in which the outer rear view mirror is closed inward in the vehicle width direction so that the side and the rear of the vehicle 100 do not appear on the outer rear view mirror. By setting the outer rear view mirror in the stored state, the area where the traveling wind hits the outer rear view mirror during the vehicle traveling can be reduced as compared with the case where the outer rear view mirror is in the expanded state.

Returning to FIG. 1, the storage device 4 includes a storage medium such as HDD (Hard Disk Drive) or SSD (Solid Disk Drive), and a non-volatile semiconductor-memory, and stores high-precision maps. The high-precision map includes various types of road information necessary for performing autonomous driving at the autonomous driving level 3 or higher. The autonomous driving of the autonomous driving level 3 is autonomous driving in which all of the dynamic driving tasks including recognition, determination, and operation are executed by the control device 5 in a limited area satisfying a predetermined traveling environment condition.

The control device 5 is an ECU (Electronic Control Unit) including a communication unit 51, a storage unit 52, and a processing unit 53. Although not shown, the control device 5 receives various types of data necessary for performing the autonomous driving at the autonomous driving level 3 in addition to the peripheral data and the driver data described above. For example, vehicle position data acquired by the positioning sensor, vehicle speed data acquired by the vehicle speed sensor, and the like are input. The control device 5 performs autonomous driving at the autonomous driving level 3 based on the input data and the high-precision map. While autonomous driving of the autonomous driving level 3 or higher is being performed, the driver can perform a second task other than driving (for example, operation of a smartphone, relaxation, and the like) and is released from the obligation to monitor the vehicle surroundings. Further, the control device 5 controls the actuator 32 to switch the state of the outer rear view mirror 31 to the expanded state or the stored state.

The communication unit 51 includes an interface circuit for connecting the control device 5 to the in-vehicle network 6. The communication unit 51 supplies data (such as peripheral data and driver data) received from the outside to the processing unit 53. In addition, the communication unit 51 outputs, to the actuator 32, a control signal for expanding or storing, for example, an outer rear view mirror output from the processing unit 53.

The storage unit 52 includes a storage medium such as HDD (Hard Disk Drive), SSD (Solid Disk Drive), and semiconductor-memory, and stores various computer programs and data used for processing in the processing unit 53.

The processing unit 53 includes one or more CPU (Central Processing Unit) and peripheral circuitry thereof. The processing unit 53 executes various computer programs stored in the storage unit 52, and is, for example, a processor.

When the outer rear view mirror 31 is in the expanded state, the traveling wind hits the outer rear view mirror 31. Therefore, the air resistance increases as much as the traveling wind hits, and the fuel consumption performance (or the power consumption performance) deteriorates. Further, since wind noise is generated, it may be a factor of vehicle noise. On the other hand, when the outer rear view mirror 31 is in the stored state, as described above, the area of the portion where the traveling wind hits the outer rear view mirror 31 is smaller than that in the expanded state. Therefore, it is possible to reduce the air resistance and to suppress the generation of wind noise.

While the autonomous driving of the autonomous driving level 3 is being performed by the control device 5, the driver is released from the obligation to monitor the periphery of the vehicle. Therefore, the driver does not need to check the outside of the vehicle by visually checking the outer rear view mirror 31. Therefore, in the present embodiment, the outer rear view mirror 31 is switched to the storage state while the autonomous driving of the autonomous driving level 3 is being performed. This makes it possible to reduce vehicle noise and air resistance during vehicle travel during autonomous driving at autonomous driving level 3. Hereinafter, the switching control of the vehicle surroundings confirmation device 3 according to the present embodiment will be described with reference to FIG. 4.

Figure 4:
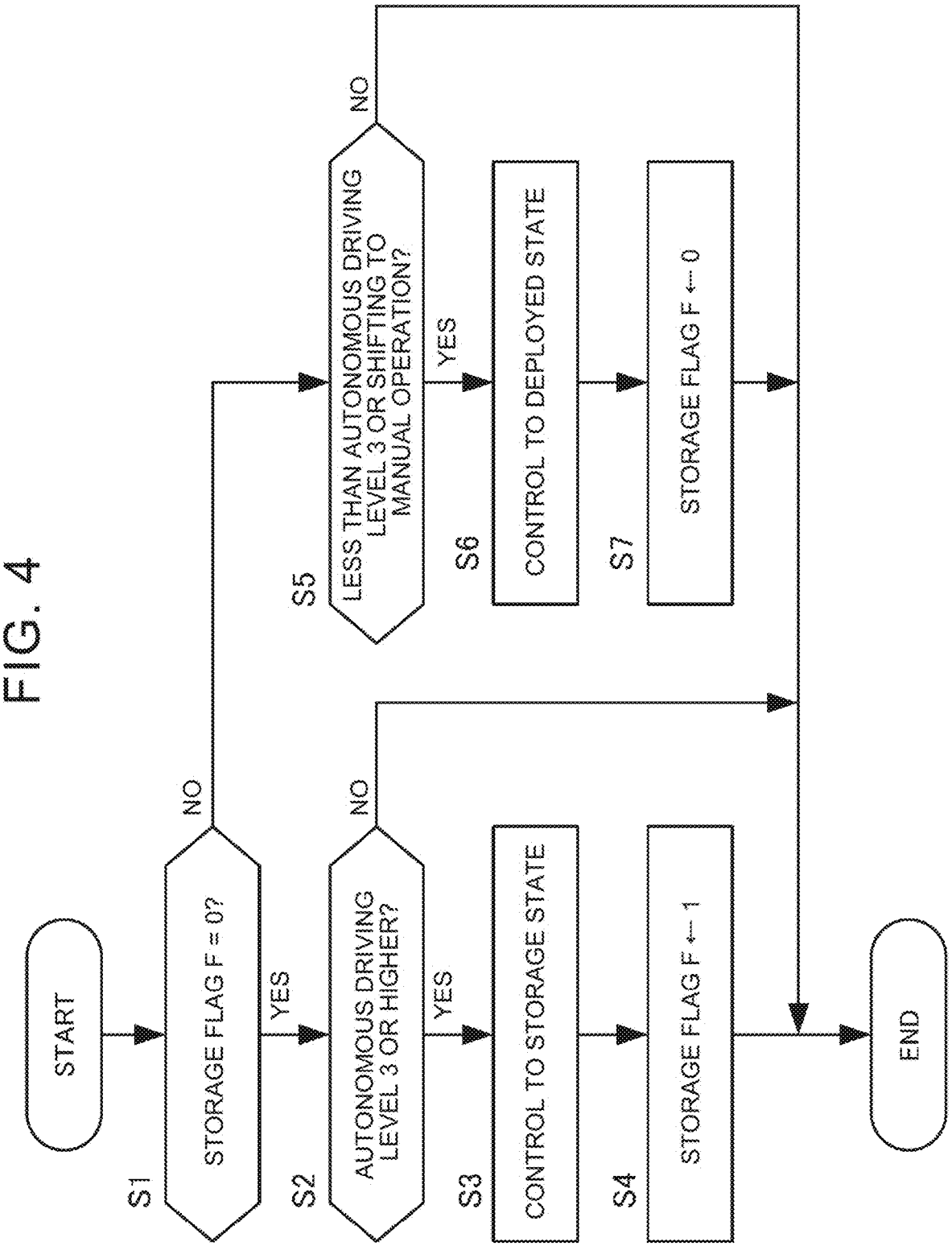
FIG. 4 is a flowchart for explaining details of switching control of the vehicle surroundings confirmation device according to the embodiment of the present disclosure.

FIG. 4 is a flowchart for explaining the details of the switching control of the vehicle surroundings confirmation device 3. The control device 5 performs the present routine by turning back at a predetermined calculation cycle.

In S1, the control device 5 determines whether or not the storage flag is set to zero. The storage flag F is a flag that is set to 1 when the outer rear view mirror 31 is switched to the storage state during the autonomous driving at the autonomous driving level 3 or higher, and the initial value is set to zero. When the storage flag is zero, the control device 5 proceeds to S2 process, and when the storage flag is 1, proceeds to S5 process.

In S2, the control device 5 determines whether or not the autonomous driving at the autonomous driving level 3 or higher is performed. If the autonomous driving of the autonomous driving level 3 or higher is performed, the control device 5 proceeds to S3 process. On the other hand, if the autonomous driving at the autonomous driving level 3 or higher is not performed, the control device 5 ends the present processing.

In S3, the control device 5 controls the actuator 32 to switch the outer rear view mirror 31 to the storage status.

In S4, the control device 5 sets the storage flag F to 1.

In S5, the control device 5 determines whether or not the autonomous driving is shifted to the autonomous driving with the autonomous driving level lower than the autonomous driving level 3 or the manual driving. The control device 5 proceeds to S6 process when the autonomous driving is shifted to the autonomous driving less than the autonomous driving level-3 or when the autonomous driving is shifted to the manual driving. On the other hand, if the autonomous driving at the autonomous driving level 3 or higher is continued, the control device 5 ends the present processing.

In S6, the control device 5 controls the actuator 32 to switch the outer rear view mirror 31 to the expanded condition.

In S7, the control device 5 returns the storage flag F to zero.

The vehicle 100 capable of performing autonomous driving at an autonomous driving level of 3 or more, in which the monitoring obligation around the vehicle is unnecessary, according to the present embodiment described above includes the vehicle surroundings confirmation device 3 attached to the outside of the vehicle in order for the vehicle occupant to confirm the situation outside the vehicle, and the control device 5. The vehicle surroundings confirmation device 3 is configured to be able to switch between a first state in which the vehicle occupant can confirm the outside of the vehicle by the vehicle surroundings confirmation device 3, and a second state in which the area of the portion where the traveling wind hits the vehicle surroundings confirmation device 3 is smaller than the deployed state. Specifically, vehicle surroundings confirmation device 3 includes an outer rear view mirror 31 or an outer rear view camera 33. The first state is an expanded state in which the outer rear view mirror 31 or the outer rear view camera 33 is expanded. The second state is a stored state in which the outer rear view mirror 31 or the outer rear view camera 33 is stored.

Then, the control device 5 is configured to switch the vehicle surroundings confirmation device 3 to the storage state when the autonomous driving at the autonomous driving level 3 or higher, which eliminates the necessity of monitoring the vehicle surroundings, is performed.

Therefore, it is possible to reduce the air resistance at the time of traveling of the vehicle during the autonomous driving at the autonomous driving level 3 or higher. Therefore, the fuel consumption performance (or the power consumption performance) of the vehicle 100 can be improved. Further, since wind noise can be suppressed, vehicle noise can be reduced.

Further, in the present embodiment, the air resistance is reduced by switching the vehicle surroundings confirmation device 3 to the stored state. Therefore, in order to obtain the effect of reducing the air resistance, it is not necessary to reduce the size of the vehicle surroundings confirmation device 3 and thus the outer rear view mirror 31, or to complicate the structure thereof. When the outer rear view mirror 31 is made small, there is a possibility that visibility of the side and the rear of the vehicle 100 deteriorates during autonomous driving or manual driving at an autonomous driving level of less than 3, which requires the obligation to monitor the periphery of the vehicle. Further, when the structure of the outer rear view mirror 31 becomes complicated, there is a possibility that the manufacturing cost increases. Therefore, according to the present embodiment, it is possible to reduce air resistance and vehicle noise during vehicle running while suppressing such deterioration in visibility and increase in manufacturing cost.

Although the embodiments of the present disclosure have been described above, the embodiments are merely a part of application examples of the present disclosure and are not intended to limit the technical scope of the present disclosure to the specific configurations of the above embodiments.

For example, in the above-described embodiment, for example, in S5 of FIG. 3, the outer rear view mirror 31 is switched to the expanded condition when it is determined that the autonomous driving is shifted to less than the autonomous driving level 3 or the manual driving is shifted to. However, for example, when it is known that the vehicle is out of the range from within the range of the high-precision map, it is known in advance that the vehicle shifts from the autonomous driving at the autonomous driving level 3 or higher to the autonomous driving or the manual driving at the autonomous driving level 3 or lower from the traveling route or the like. In this case, the outer rear view mirror 31 may be switched to the expanded state at a predetermined timing before the transition (for example, several seconds before the transition or several hundred meters before the transition point).

Further, in the present embodiment described above, the outer rear view mirror 31 is switched to the storage state when the autonomous driving of the autonomous driving level 3 or higher is performed. However, even in a case where the outer rear view mirror 31 is controlled to be in the stored state during the autonomous driving at the autonomous driving level 3 or higher, the outer rear view mirror 31 may be temporarily switched to the expanded state, for example, when at least one of the following expansion conditions is satisfied.

The first of the deployment conditions is, for example, when the winker is operated. This is because, even if there is no obligation to monitor the vicinity of the vehicle, there is a certain number of drivers who want to confirm the adjacent lane in the turn-on direction of the winker by the outer rear view mirror 31 during the turn-on operation. This is because there is a possibility that the driver may override the steering wheel operation or the like without desiring to change the lane to an adjacent lane in the turn-on direction of the winker.

During the winker operation, for example, only one of the outer rear view mirrors 31 on the winker operation side may be in the expanded state, or both of the left and right outer rear view mirrors 31 may be in the expanded state. When only one of the outer rear view mirror 31 is in the expanded state, as compared with the case where both the left and right outer rear view mirrors 31 in the expanded state, the running wind hits only one of the outer rear view mirror. Therefore, the effect of reducing air resistance and vehicle noise can be improved. On the other hand, when both the left and right outer rear view mirrors 31 are in the expanded state, the air resistance on the side where the traveling wind hits does not increase as compared with the case where only one of the outer rear view mirrors 31 is in the expanded state. The left and right air resistances are uniform. Therefore, deterioration in running performance can be suppressed.

A second example of the deployment condition is when the hazard lamp is activated. This is because, when the hazard lamp is activated, there is a possibility that some problem has occurred, and it is considered that there are a certain number of drivers who wish to confirm the surroundings by the outer rear view mirror 31.

A third example of the development condition is a lane change execution such as a LCA (Lane Change Assist) operation. This is because there is a certain number of drivers who want to confirm the adjacent lane to be the lane change destination by the outer rear view mirror 31 at the time of lane change.

A fourth example of the deployment condition is a low-speed running at a predetermined speed or less. This is because, during low-speed traveling, even if the traveling wind hits the outer rear view mirror 31, wind noise is less likely to be generated, and the air resistance is also small. In this expansion condition, for example, the outer rear view mirror 31 may be uniformly switched to the expansion state as long as the speed is equal to or lower than the predetermined speed. Alternatively, the outer rear view mirror 31 may be switched to the expanded state when it is determined that the vehicle is congested based on surrounding data or the like, that is, when it is determined that the vehicle is a scene in which the vehicle is traveling at a low speed.

A fifth example of the deployment condition is when the vehicle travels at a specific point such as a merging portion of a road. This is because, for example, it is considered that there are a certain number of drivers who want to confirm the merging lane by the outer rear view mirror 31 while the other vehicle is traveling in the merging portion merging from the merging lane to the main lane (the host vehicle traveling lane).

A sixth example of the deployment condition is an emergency vehicle detection time such as an ambulance, a fire engine, or a police vehicle. This is because, when an emergency vehicle is detected, it is considered that there are a certain number of drivers who want to confirm the emergency vehicle by the outer rear view mirror 31 in order to consider the emergency vehicle.

A seventh example of the development condition is a driver's driving intention detection. This is because it is preferable to switch the outer rear view mirror 31 to the expanded state as soon as possible when the driver's intention of driving (intention of override) can be detected from a specific operation of the driver, for example, an operation to grasp the steering wheel by the driver. The driver's driving intention can be detected, for example, by detecting a specific operation based on the driver data.

As described above, the control device 5 may be configured to switch the vehicle surroundings confirmation device 3 to the first state (deployed state) when the autonomous driving at the autonomous driving level 3 or higher is performed and the vehicle surroundings confirmation device 3 is switched to the second state (stored state) and when a predetermined deployment condition is satisfied. As described above, the deployment condition is, for example, when the winker is operated, when the hazard ramp is operated, when the lane is changed, when the vehicle travels at a low speed equal to or lower than a predetermined speed, when the vehicle is detected as a traffic jam, when the vehicle travels on the merging portion of the road, when the vehicle is detected as an emergency, or when the driver detects an intention of driving.

As a result, it is possible to reduce air resistance and vehicle noise during vehicle traveling while balancing safety, driver preferences, and the like.

Further, in the above-described embodiment, the computer program (for example, the switching control of the vehicle surroundings confirmation device 3) executed by the control device 5 may be provided in a form recorded in a computer-readable portable recording medium such as a semiconductor memory, a magnetic recording medium, or an optical recording medium.

What is claimed is:

1. A vehicle that is configured to perform autonomous driving at a predetermined level or higher, at which monitoring a periphery of the vehicle is unnecessary, the vehicle comprising:
   an outer rearview mirror that is attached on an outside of the vehicle in order for a vehicle occupant to confirm a situation of vehicle surroundings; and
   a control device including a communication unit, a storage unit, and a processor, the processor configured to determine whether the autonomous driving at the predetermined level or higher is performed,
   in a case where the autonomous driving at the predetermined level or higher is performed, control an actuator of the outer rearview mirror to fold the outer rearview mirror inward in a vehicle width direction, and
   in a case where the autonomous driving at the predetermined level or higher is performed, the outer rearview mirror is folded, and an emergency vehicle is detected, control the actuator of the rearview mirror to unfold the outer rearview mirror outward in the vehicle width direction.

2. A computer program for a control device for a vehicle that is configured to perform autonomous driving at a predetermined level or higher, at which monitoring a periphery of the vehicle is unnecessary, the computer program causing the control device to execute:
   determining whether the autonomous driving at the predetermined level or higher is performed;
   in a case where the autonomous driving at the predetermined level or higher is performed, controlling an actuator of an outer rearview mirror that is attached on an outside of the vehicle in order for a vehicle occupant to confirm a situation of vehicle surroundings, to fold the outer rearview mirror inward in a vehicle width direction; and
   in a case where the autonomous driving at the predetermined level or higher is performed, the outer rearview mirror is folded, and an emergency vehicle is detected, controlling the actuator of the outer rearview mirror to unfold the outer rearview mirror outward in the vehicle width direction.

\* \* \* \* \*